United States Patent [19]
Vidacovich et al.

[11] Patent Number: 5,402,515
[45] Date of Patent: Mar. 28, 1995

[54] FIBER DISTRIBUTION FRAME SYSTEM, CABINETS, TRAYS AND FIBER OPTIC CONNECTOR COUPLINGS

[75] Inventors: Kennth J. Vidacovich, Travis; Donald G. Doss, Williamson, both of Tex.

[73] Assignee: Minnesota Mining and Manufacturing Company, St. Paul, Minn.

[21] Appl. No.: 203,822

[22] Filed: Mar. 1, 1994

[51] Int. Cl.[6] .................................................. G02B 6/36
[52] U.S. Cl. ...................................... 385/135; 385/136
[58] Field of Search ............... 385/134, 135, 147, 136, 385/137, 139

[56] References Cited
U.S. PATENT DOCUMENTS

| | | | |
|---|---|---|---|
| 4,702,551 | 10/1987 | Coulombe | 385/135 |
| 4,792,203 | 12/1988 | Nelson et al. | 385/135 |
| 4,793,681 | 12/1988 | Barlow et al. | 385/135 |
| 4,824,196 | 4/1989 | Bylander | 385/134 |
| 4,840,449 | 6/1989 | Ghandeharizadeh | 385/135 |
| 4,986,762 | 1/1991 | Keith | 439/131 |
| 5,067,784 | 11/1991 | Debortoli et al. | 385/53 |
| 5,071,211 | 12/1991 | Debortoli et al. | 385/76 |
| 5,093,887 | 3/1992 | Witte | 385/135 |
| 5,100,221 | 3/1992 | Carney et al. | 385/135 |
| 5,115,489 | 5/1992 | Norris | 385/135 |
| 5,138,688 | 8/1992 | Debortoli | 385/135 |
| 5,142,606 | 8/1992 | Carney et al. | 385/134 |
| 5,208,894 | 5/1993 | Johnson et al. | 385/135 |
| 5,231,687 | 7/1993 | Handley | 385/139 |
| 5,235,665 | 8/1993 | Marchesi et al. | 385/135 |
| 5,241,617 | 8/1993 | Peacock et al. | 385/135 |
| 5,247,603 | 9/1993 | Vidacovich et al. | 385/135 |
| 5,249,252 | 9/1993 | Noto | 385/135 |
| 5,265,187 | 11/1993 | Morin et al. | 385/135 |
| 5,339,379 | 8/1994 | Kutsch et al. | 385/135 |

*Primary Examiner*—Frank Gonzalez
*Attorney, Agent, or Firm*—Gary L. Griswold; Walter N. Kirn; Jack V. Musgrove

[57] ABSTRACT

A fiber optic distribution system provides a frame having several bays for receiving connector modules, associated jumper organizers, and upper and lower troughs for conveying jumper fibers between adjacent bays. The jumper organizers are constructed such that inter-bay jumpers need not undergo more than two continuous bends of 90°, and further easily store excess jumper slack, such as is required to avoid modal noise, even when both ends of the jumper are terminated in the same tray or cabinet. Each connector module has a plurality of connector trays pivotally attached to a cabinet using a swivel bracket which is located adjacent a gap in the tray sidewall; this allows placement of the incoming fibers into the tray without the need for threading the fibers through a hole, and also minimizes fiber stress during pivoting movement of the trays. Front and back plane storage areas are provided for receiving excess slack from both incoming and jumper fibers, and a passageway may join these areas to allow customized fiber circuit paths on the tray. Boot biasing ribs are provided on the tray, along with radius limiting ribs, to maintain a proper bend radius of the jumper fibers as they exit the tray. A novel coupling adapter is also provided which flips one end of the interconnection device upward to allow easier installation of a connector plug.

28 Claims, 14 Drawing Sheets

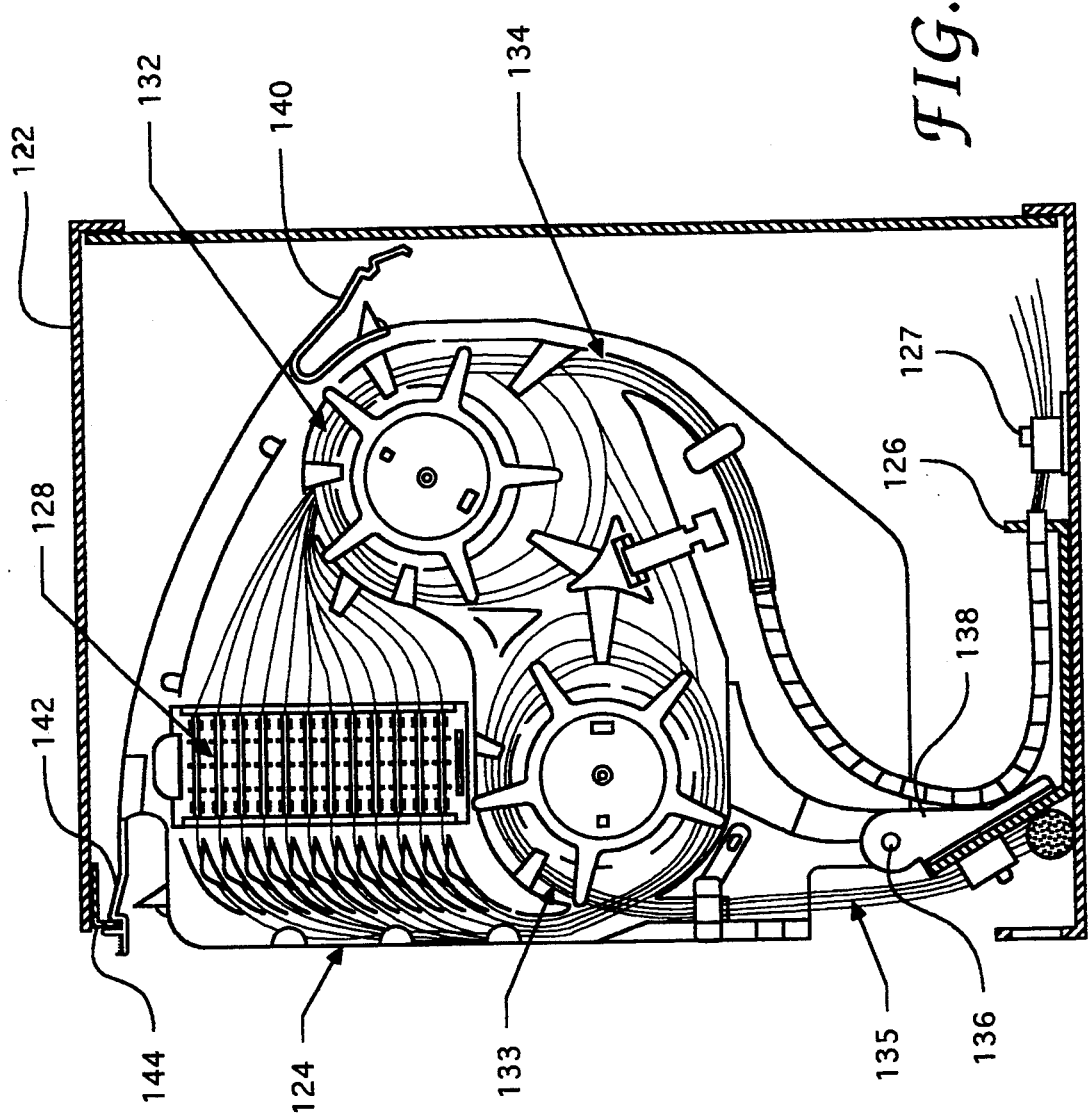

FIBER DISTRIBUTION FRAME SYSTEM, CABINETS, TRAYS AND FIBER OPTIC CONNECTOR COUPLINGS

BACKGROUND OF THE INVENTION

1. Field of the Invention

The present invention generally relates to connection systems for cables, and more particularly to a distribution frame system used to cross-connect and interconnect optical fibers used in telecommunications, the system providing improved management of jumper cables as well as storage and interconnection of fibers on a given tray.

2. Description of the Prior Art

In the past several years, optical fibers have become the preferred medium, over copper wire, for carrying telecommunications signals. Cable management is quite different with optical fibers as opposed to copper wiring, particularly due to the signal losses which can occur when an optical fiber is bent or otherwise damaged. Distribution systems for optical fibers have been devised to minimize such losses. For example, U.S. Pat. No. 5,093,887 discloses a cabinet having a front panel and several shelves which slide out the front, each of the shelves supporting one or more splice trays (splice trays may also be accessible front the back plane of frame, as described in U.S. Pat. No. 5,241,617). Incoming and outgoing fibers pass through cutouts formed in the back, bottom or top walls of the cabinet. Clips are used to retain the fibers on the trays with an appropriate minimum bend radius, and a pivoting support arm is used with each shelf to also minimize bending stress to the fibers In U.S. Pat. No. 4,792,203, storage trays mounted along the left and right inner sides of the cabinet pivot outwardly through the front access plane. The trays are designed to provide separate pathways for the storage of slack from three interconnected fibers, namely, the trunk fiber, the pigtail (or jumper) fiber, and the distribution fiber.. The trunk and distribution fibers exit through cutouts formed in the side walls of the cabinet.

U.S. Pat. No. 5,067,784 shows a similar design in which trays are also mounted along the left and right inner sides of the cabinet, but they slide out rather than pivot. Provision is made for jumper cables to cross from a tray on one side of the cabinet to a tray on the other side. Surplus slack in the jumper is allowed to hang in a central area of the cabinet. Each of the trays has a mounting region or bulkhead for receiving interconnected pairs of optical fiber connectors, and a region behind the bulkhead for storing excess slack from the fibers which exit at the back of the tray. A hinged plate covers this rear area. The fibers which are connected to the front of the bulkhead exit the tray in an arcuate extension located at the front corner of the tray. Curved vanes are used to limit the minimum bend radius of the fibers which undergo a 90° bend from the bulkhead to the arcuate extension.

A similar connector tray is illustrated in U.S. Pat. No. 5,071,211. In that construction, however, the forwardmost portion of the tray is hinged and movable downward to facilitate access to the front portion of the bulkhead.

Another fiber optic distribution system, described in U.S. Pat. No. 4,824,196, has several modules or drawers pivotally attached to the inside of a cabinet. A smaller splice tray with separation pages may be attached to the drawer, behind the bulkhead. The bulkhead may be of a stair-step or zig-zag shape, whereby the forward-exiting fibers do not have to undergo as large a bend angle, and also allows the width of the drawer to be shorter. The forwardmost portion of the drawer forms a door which again hinges downwardly.

As further taught in U.S. Pat. No. 5,247,603, the trays may be designed for cross-connection (use of a jumper) or interconnection (no jumper). The disclosed construction places the trays in a page array wherein each tray can be held in one of three access positions. That patent discusses and cites several other references of general relevance to distribution systems and connector trays.

While the foregoing designs address some aspects of fiber optic cable management, they have proven inadequate for the increasingly demanding standards in such systems. For example, they must be able to accommodate transmission rates of up to 2 Gb with acceptable bit-error rates. It is also believed that jumper fibers should now be two meters or more in length to minimize modal noise. In existing distribution systems, the surplus slack from jumper cables of this length must be wound excessively around the various posts and walls, and tend to bind or otherwise make the fibers more difficult to handle. These systems do not adequately address the management of very long jumpers for (i) interconnection of a pair of fibers each terminated in the same drawer or cabinet, (ii) interconnection of a pair of fibers whose ends terminate in different cabinets, but in the same bay of a distribution frame, or (iii) interconnection of a pair of fibers whose ends terminate in different bays of a multibay distribution frame.

In addition to inadequacies in the management of jumper cables, prior art distribution systems can also use improvement in the storage and interconnection of fibers on a given drawer or tray. For example, in the construction shown in U.S. Pat. No. 5,067,78, while the vanes are useful in maintaining fiber radius against pulling forces, the back side of the vanes can actually cause severe bending of the fiber if the connector has an extended boot or grip. Several conventional connectors have such boots which extend all the way to, and contact the back side of, the vanes, inducing microbends in the fiber. Indeed, comparison of this design with that depicted in U.S. Pat. No. 5,071,211 (FIG. 23) reveals that the vanes must be completely removed in order for the front of the tray to accommodate the longer boots, yet there is still undue bending of the fibers where they contact the forwardmost wall of the tray. It would, therefore, be desirable to devise a fiber optic distribution system which can better control the minimum bend radius of stored and interconnected fibers on a given tray, as well as properly manage surplus jumper cable, whether it is an intracabinet, intrabay or interbay cable. It would be further advantageous to provide a construction which allows for back plane access through the front panel of the cabinet.

SUMMARY OF THE INVENTION

The present invention provides a fiber optic distribution frame system generally comprising at least one bay located on a main distribution frame, the bay including one or more cabinets each having a plurality of connector trays and, optionally, one or more accessory trays for splices, couplers, splitters, etc. Each bay also includes several jumper organizers and upper and lower troughs for conveying jumper fibers between bays in a multi-bay frame. The system thus allows for both interconnection and cross-connection of fibers. Each jumper organizer has a spool for supporting or directing the jumper fibers, and the overall arrangement allows for the management of very long fibers whereby any one fiber undergoes at most two bends of more than 90°, and these one or two bends are at most 180°, thereby reducing stress on the fibers and, consequently, minimizing signal degradation through the jumper. The use of many spools eliminates the need to excessively wind fiber slack along any one spool, thus avoiding binding of the fibers and generally facilitating tracing and handling of a single fiber.

The connector drawers are pivotally attached to the cabinets and are provided with means to retain them in storage and access positions and minimize fiber bending during drawer movement. Each drawer is also designed to maintain a minimum radius on the fibers, by providing a slack storage area for incoming fibers, and using vanes or walls to maintain a minimum radius for outgoing fibers. The present invention uses a double-walled rib to additionally provide a surface which biases the terminal portion of the outgoing fiber toward the minimum radius; this biasing surface is particularly useful when the connector at the terminal end of the outgoing fiber has an extended boot. Slack storage areas may be provided for front plane and back plane, with the ability to provide interconnections at an overlapping portion of the slack storage areas.

BRIEF DESCRIPTION OF THE DRAWINGS

The invention will best be understood by reference to the accompanying drawings, wherein:

FIGS. 10A, 10B and 10C are side elevational views depicting movement of the connector tray of FIG. 9 between a stored position, a tray access position, and a back plane access position;

DESCRIPTION OF THE PREFERRED EMBODIMENT

Figure 1:
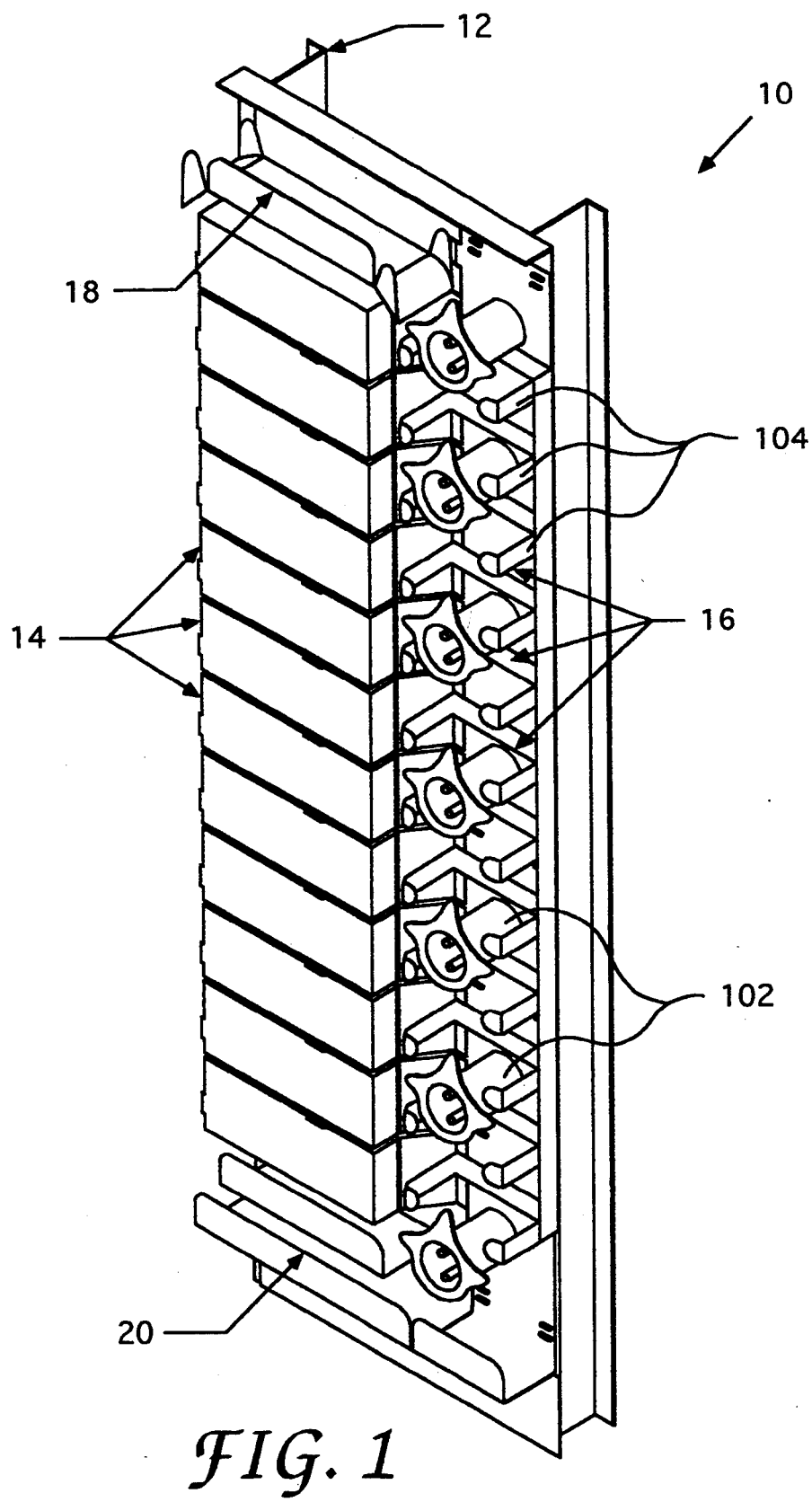
FIG. 1 is a perspective view of one embodiment of the fiber optic distribution system of the present invention.

With reference now to the figures, and in particular with reference to FIG. 1, there is depicted one embodiment 10 of fiber optic distribution system the present invention. Distribution system 10 is generally comprised of a frame 12 defining a bay, with several connector modules 14 attached to frame 12 within the bay, and several jumper organizers 16 located adjacent the connector modules such that, when frame 12 is upright, jumper organizers 16 are arranged generally vertically. Connector modules 14 are also stacked vertically, and the system may further include two troughs 18 and 20 located, respectively, at the upper and lower ends of frame 12. As discussed further below, frame 12 may comprise a conventional equipment rack formed of steel members.

Figure 2:
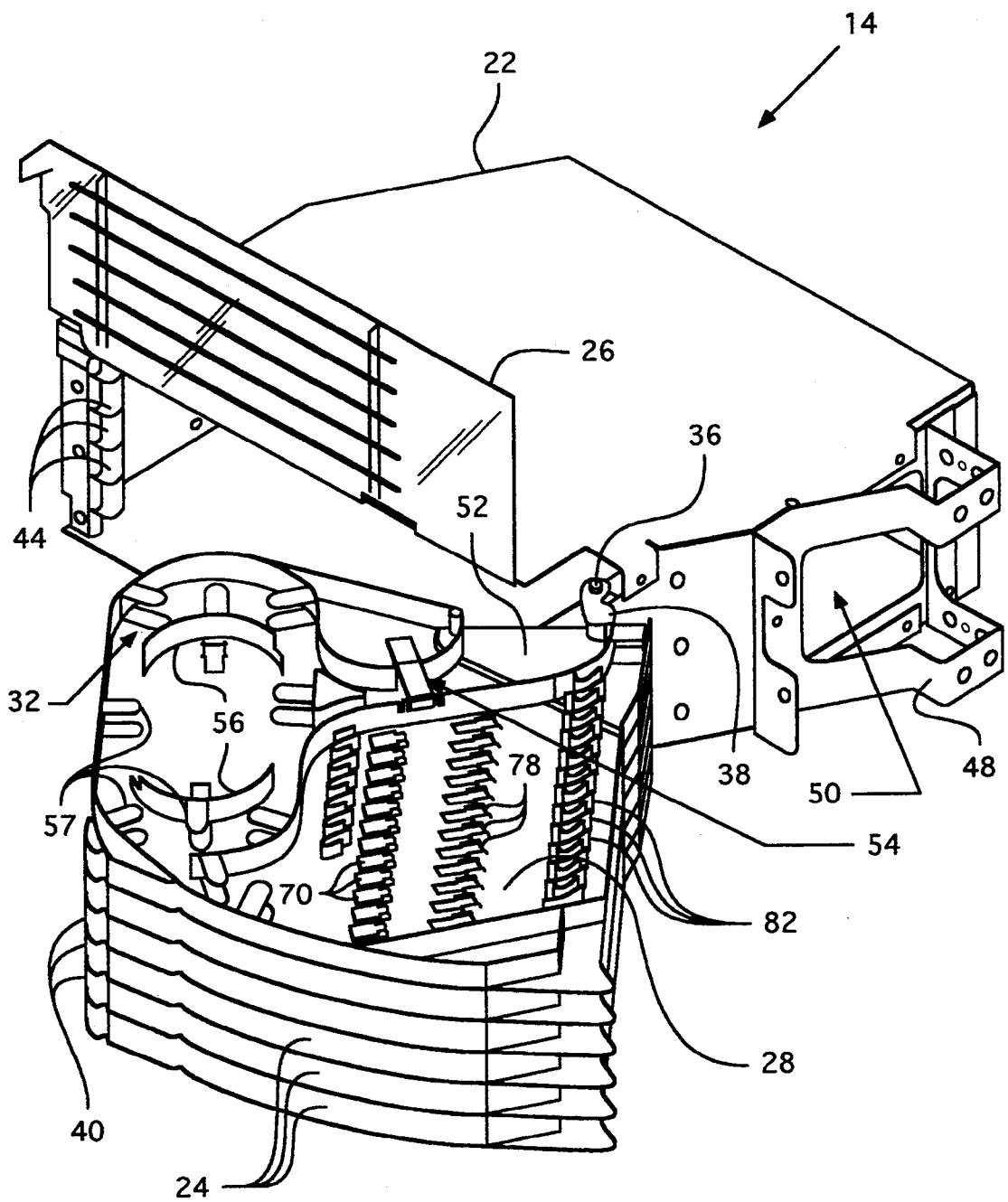
FIG. 2 is a perspective view of the multitray connector module used in the present invention.
Figure 3:
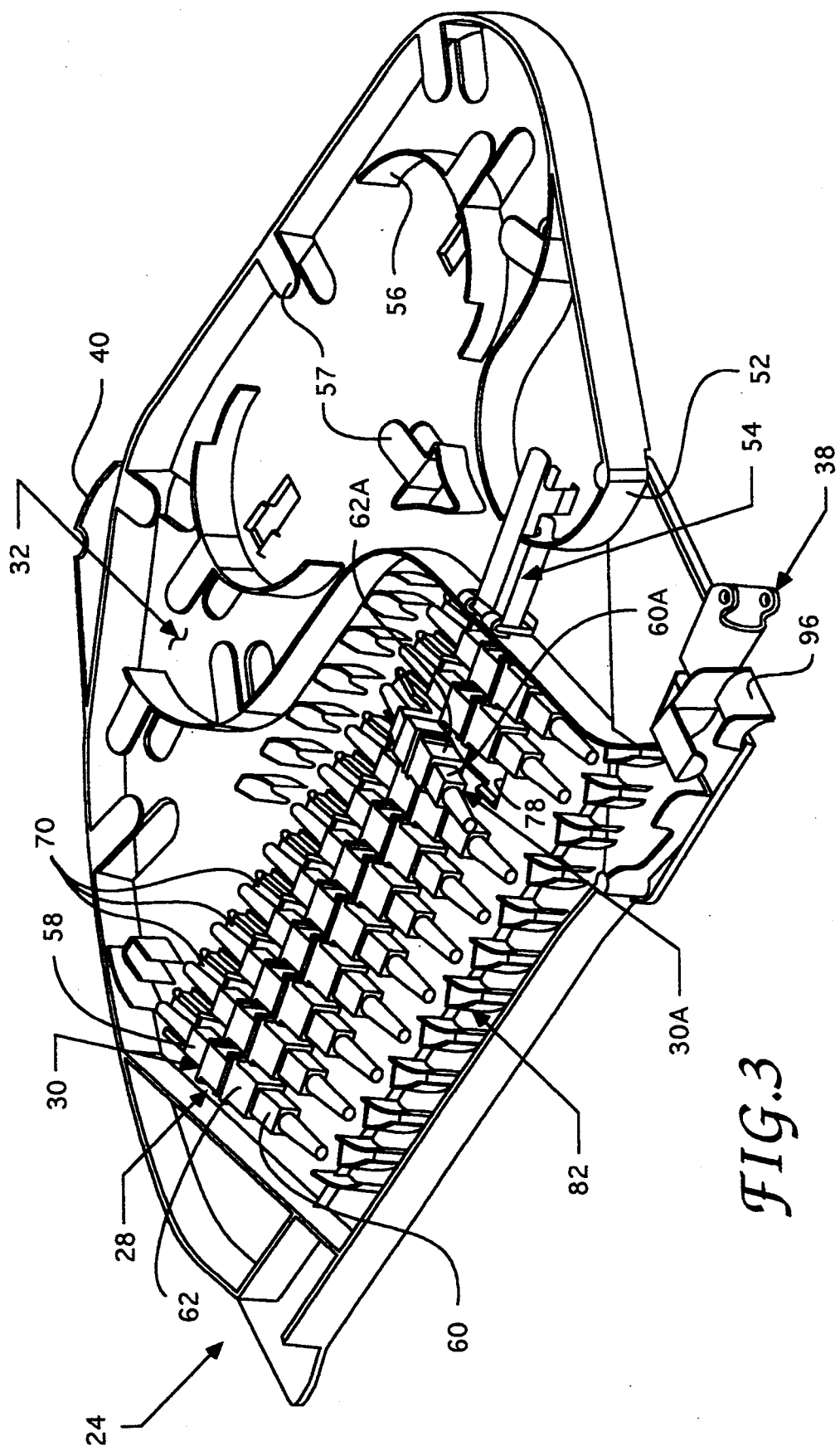
FIG. 3 is a perspective view of one connector tray used in the connector module of the present invention.

Referring now to FIG. 2, each connector module 14 is comprised of a cabinet or housing 22 with a plurality of connector drawers or trays 24 located therein. Cabinet 22 may be constructed of any durable material, and is preferably formed by bending sheet metal. A front panel 26, preferably transparent (polymeric) and having preprinted matter to facilitate identification of the trays, may be attached to the primary opening of cabinet 22. Trays 24, shown in further detail in FIGS. 3 and 4, have a forward area 28 which accommodates a plurality of fiber interconnection devices 30, and a rear area 32 for storing slack from the incoming fibers 34. Trays 24 are attached to cabinet 22 in a hinged manner so that they may pivot from a storage position completely within cabinet 22 (FIG. 4), to a tray access position wherein only interconnection area 28 is exposed, and further to a back plane access position (FIG. 2) wherein slack storage area 32 is accessible and wherein access to the interior of cabinet 22 is further available. The trays preferably pivot along a common line, such as by using a pin or screw 36 passing through the swivel brackets 38 on each tray 24. Means may be provided to releasably secure the trays in the first two positions, such as a clip 40 attached to the edge of each tray proximate rear storage position 32. Clip 40 has a small bend to provide a stable interference fit on either of two clasps 42 and 44, the former being attached to a rear wall of cabinet 22, and the latter being attached to a side wall of cabinet 22 near the primary opening thereof.

Figure 5:
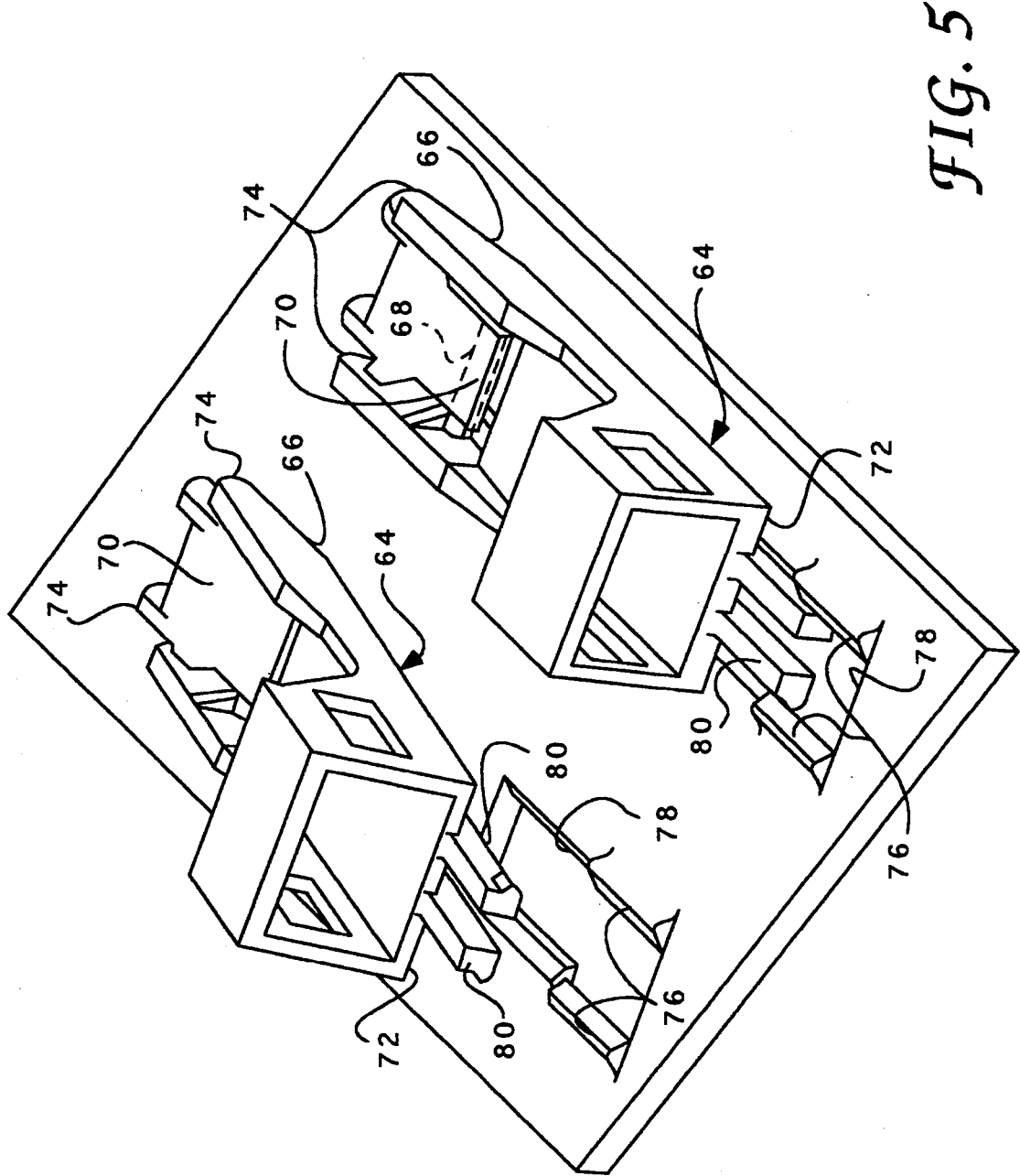
FIG. 5 is a perspective view of the novel coupling adaptor used to movably retain optical fiber connectors on the connector tray.

Incoming fibers 34, secured to the back plane of frame 12 using a cable clamp 46 attached to the cabinet mounting bracket 48, enter cabinet 22 through an opening 50 in another side wall of cabinet 22, and further enter a given tray 24 by passing through a gap 52 in the side wall of the tray. It is desirable to provide as wide a gap 52 as feasible since it facilitates field installation of prestubbed fiber optic cables, i.e., there is no need to thread the prestubbed cables through small holes. A clip 54 having a piece of foam compresses the fibers and provides strain relief for the fibers as the tray pivots about pin 36. A foam clip can interface with 250 μm, 900 μm or 3 mm fiber, or with spiral wrap or breakout tubing. Excess slack from the fibers is wound around the minimum bend radius walls 56 is slack storage area 32, which may further be provided with several catches or tabs 57 to help keep the fibers in the tray. The terminal ends of fibers 34 are directed to interconnection area 28, and are typically attached to a fiber optic connector, such as a ferrule-type connector 58 which mates with an identical connector 60 using a common receptacle or coupling 62. Several such interconnection devices 30 are shown side-by-side in FIG. 3. One device 30a is shown in a slightly raised position to facilitate connection of connector 60a with coupling 62a. While this feature may be achieved in several different manners (cf. U.S. Pat. No. 4,986,762), a novel construction is taught herein providing a robust connection which further is highly resistant to side pull. This construction is shown in FIG. 5.

The enhanced access to connector 60a is achieved by using an elongated adapter 64 which is pivotally anchored at one end 66 to tray 24. In the preferred embodiment, pivotally attachment is achieved by providing an axle or trunnion 68 at end 66 which engages a cantilever arm 70 attached to and raised slightly above the base of tray 24. Arm 70 may be fabricated by stamping it from sheet metal forming the base of tray 24. Coupling 62a is attached to the other end 72 of adapter 64, which further enhances access to the coupling by raising it above the tray base in addition to pivoting its axis. Means are also provided to releasably secure adapter 64 in two positions, namely, the operational position, wherein the alignment axis of coupling 62a is generally parallel with the surface of the tray's base, and a retracted position wherein the axis is skewed with respect to the base. Two fingers or tines 74 extending from end 66 of adapter 64, beyond trunnion 68, have inwardly directed protrusions which create a friction fit with outwardly direct protrusions on cantilever arm 70. In this manner, if the protrusions of tines 74 are above those of arm 70, then adapter 64 will be biased toward the operational position, blot if the tine protrusions are below those on arm 70, then adapter 64 will be biased toward the retracted position. The tines are bent slightly upward with respect to the length of adapter 64, to place their protrusions just above arm 64 when in the operational position.

Further stability and resistance to side-pull is achieved by providing means for releasably securing end 72 of adapter 64 to the base of tray 24. In the depicted embodiment, this is accomplished by forming bumps or ridges 76 on either side of a hole 78 formed in the base of tray 24, and by providing end 72 with latch members 80 which releasably engage hole 78 and ridges 76 when adapter 64 is in the operational position. This construction helps retain adaptor more securely since it fixes the end where the coupling is attached. When adapter 64 is moved from the retracted position to the operational position, a first snap is heard and felt when the protrusions on tines 74 pass over those on arm 70, and a second snap is heard and felt as further pressure is applied and latch members 80 engage ridges 76.

Figure 4:
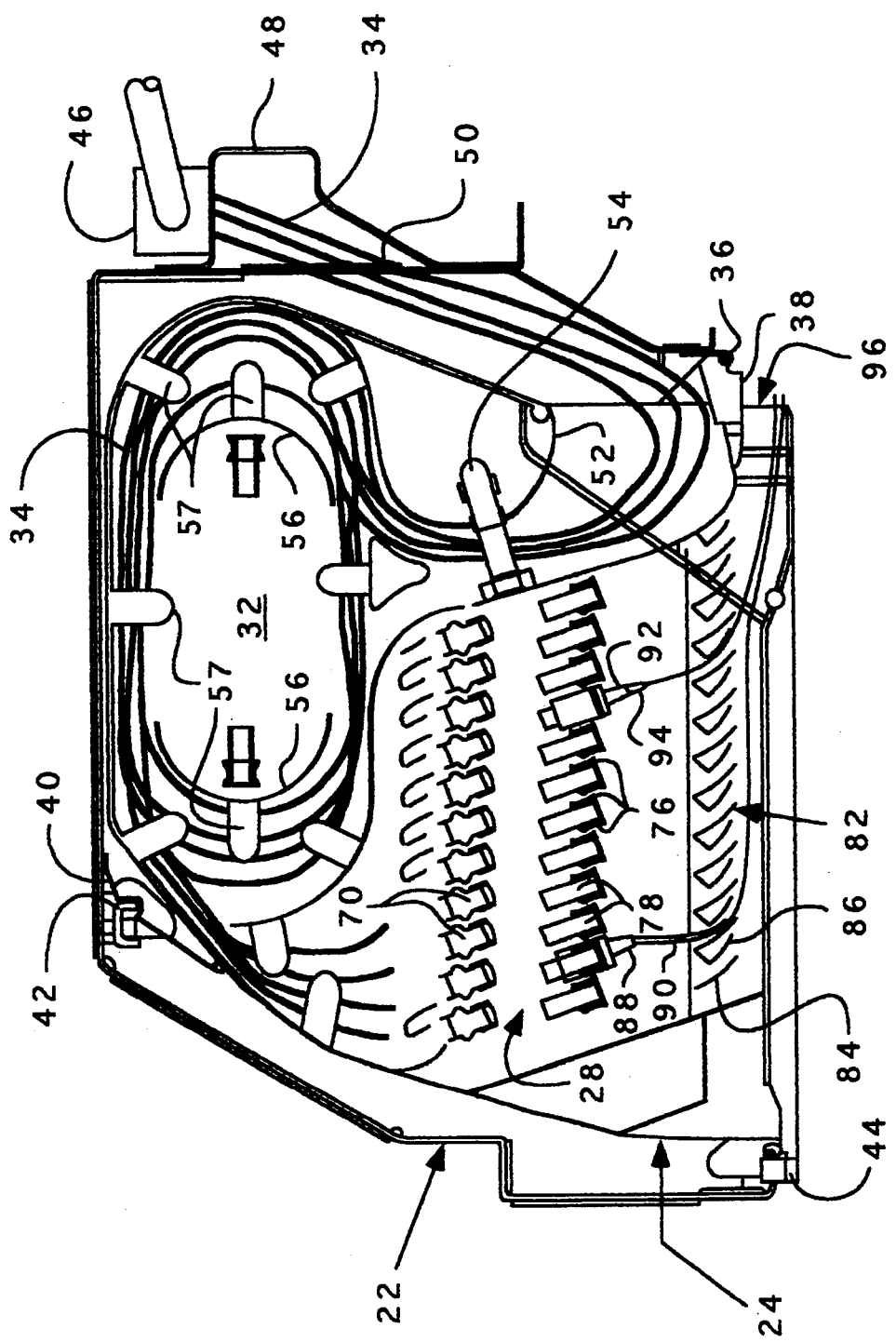
FIG. 4 is a top plan view depicting the tray of FIG. 3 stored completely within the connector module.

Returning to FIG. 3 and, particularly, FIG. 4, tray 24 is also provided with means for maintaining the minimum bend radius of the fibers in interconnection area 28, namely, a plurality of double-walled ribs 82 attached to, or integrally formed with, the base of tray 24. Adjacent ribs 82 define pairs of surfaces 84 and 86 which serve, respectively, to bias a fiber toward, or maintain a fiber at, a minimum bend radius. For example, a fiber connector 88 is shown having a long strain relief boot 90. In conventional connector trays, boot 90 resists the bending tension of the fiber with the result that a more acute fiber bend will develop just beyond the boot. While this limitation could be overcome by widening the tray, it is generally desirable to keep the tray as compact as possible. Surface 84 serves to contact long boots and bias them toward the minimum bend radius, so that the fiber need not undergo excessive bending just beyond the boot, and allowing the tray to remain more compact. Surface 86 maintains the minimum bend radius for a connector 92 which has a smaller boot 94. Interconnected fibers exit tray 24 at jumper port 96, proximate swivel bracket 38, to minimize fiber stress during tray movement.

Figure 6:
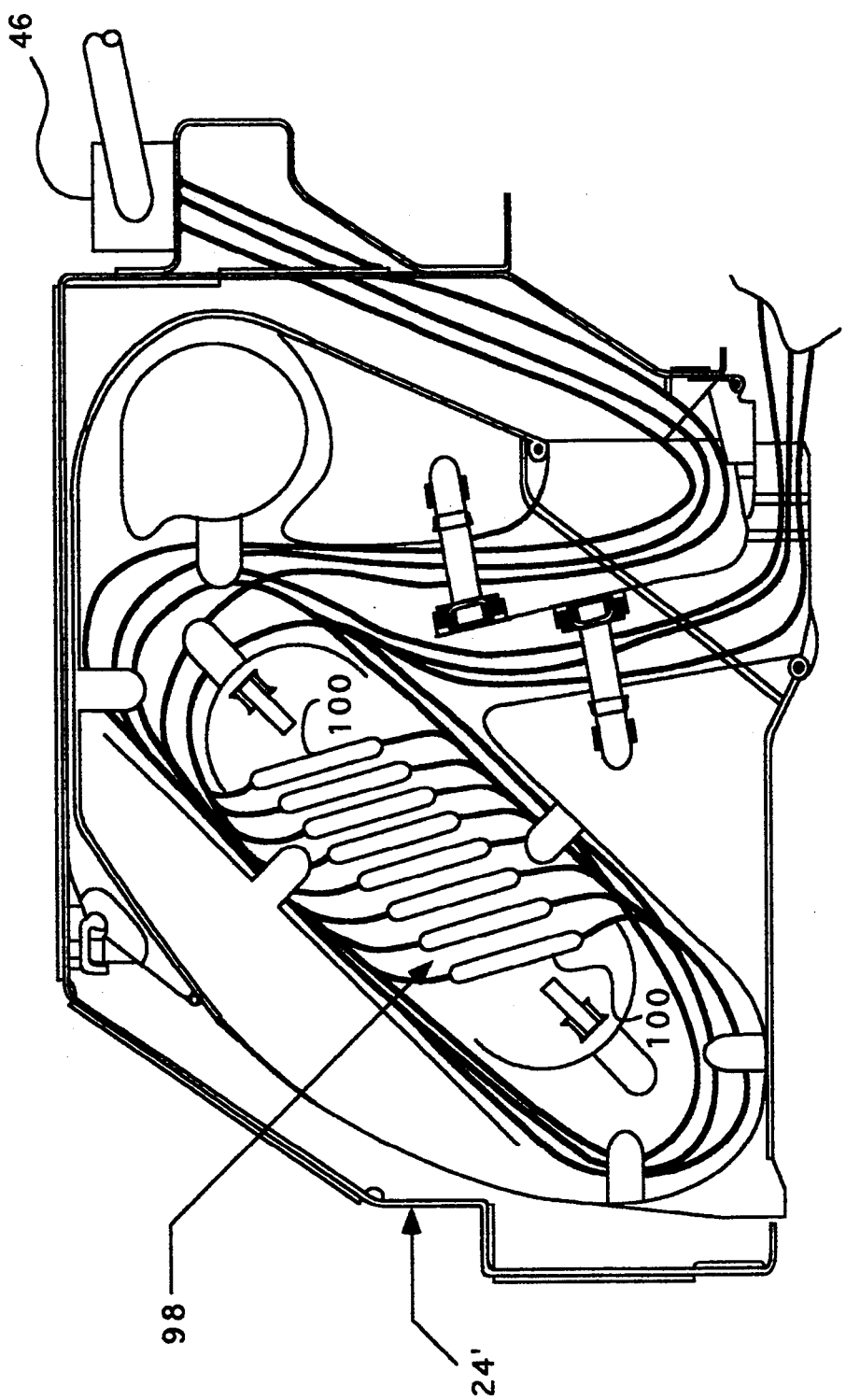
FIG. 6 is a top plan view of an optional splice tray which may be stored in the connector module.

With further reference to FIG. 6, a given cabinet 22 may hold one or more accessory trays 24' which are very similar to connector trays 24. Different accessory trays may be provided for different purposes, such as excess fiber slack storage. The depicted accessory tray 24' is designed for splice storage, and has a splice area 98 for receiving a plurality of discrete fiber splices 100 which are used to interconnect pigtail fibers to feeder/distribution fibers. The term "splice" usually refers to an interconnection device designed for permanent use, while a "connector" usually refers to a device which is disengageable and rematable. Those skilled in the art will appreciate, however, that these terms should not be construed in a limiting sense with regard to the present invention, since the invention as claimed is applicable to distribution systems and connector trays having devices for both the permanent and temporary interconnection of optical fibers. Other interconnection devices may further be used with the present invention, such as couplers, splitters, etc.

Figure 7:
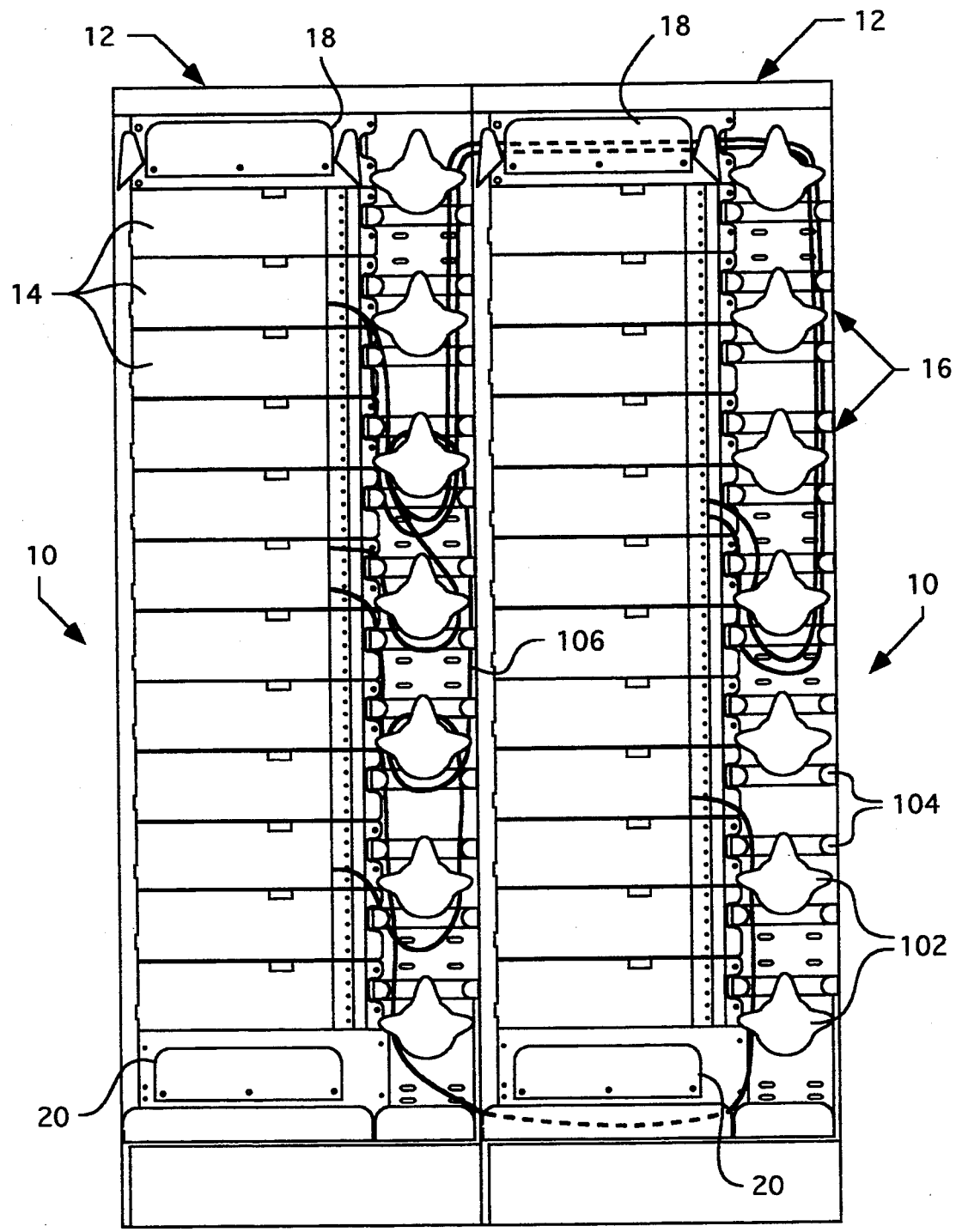
FIG. 7 is a front elevational view of two adjacent bays made in accordance with the present invention.
Figure 8:
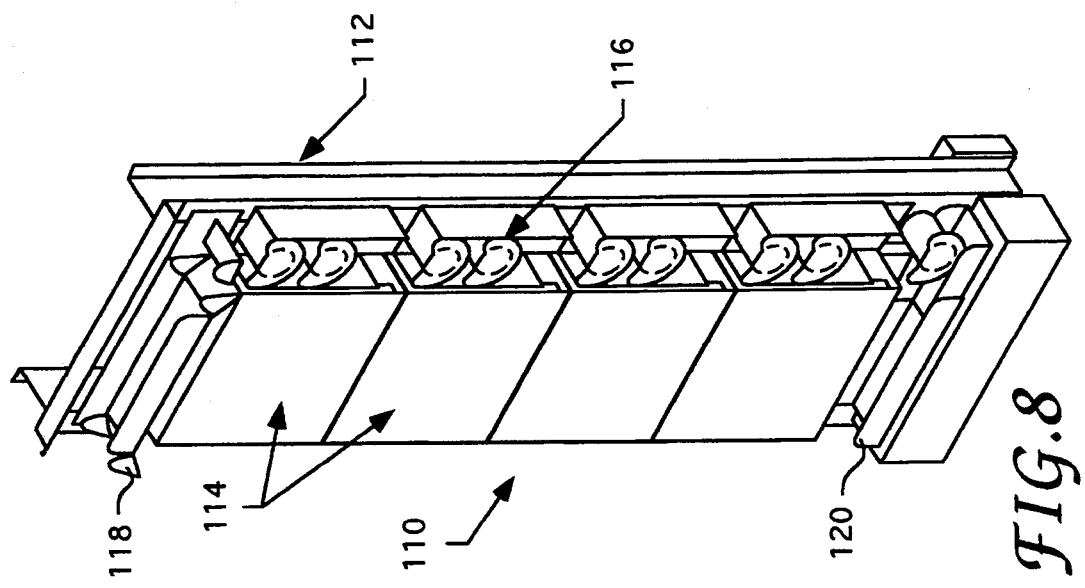
FIG. 8 is a perspective view of another embodiment of the fiber optic distribution system of the present invention.
Figure 12:
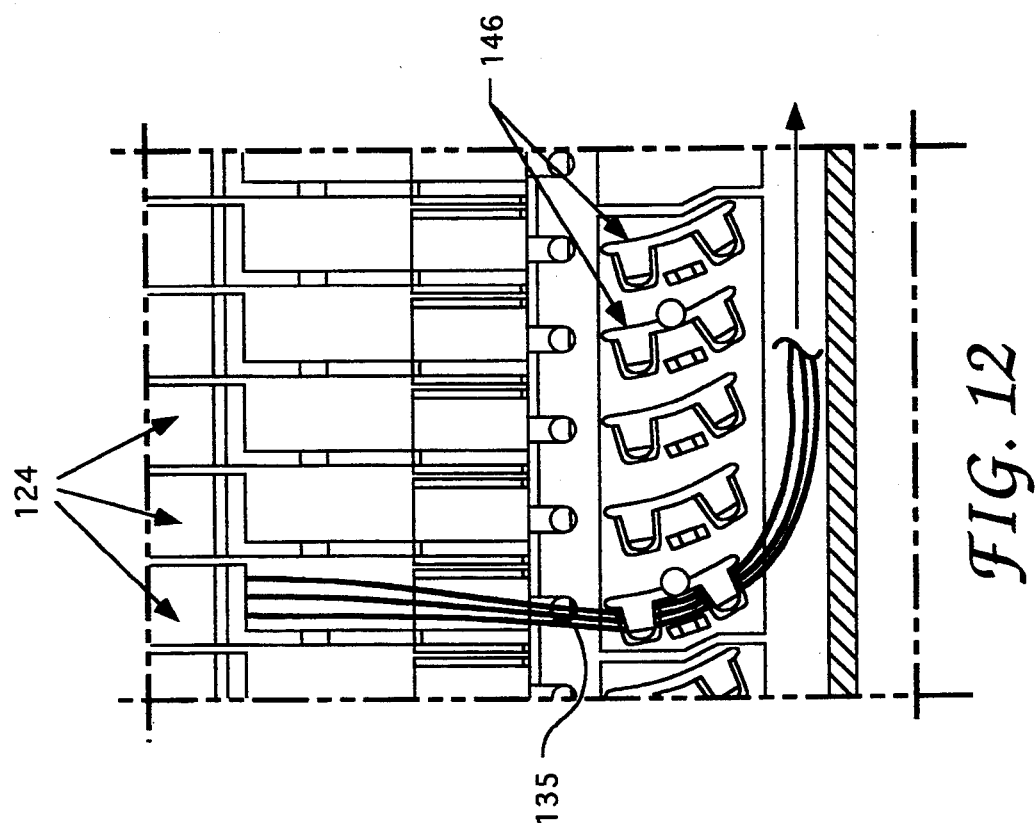
FIG. 12 is an elevational view taken along lines 12—12 of FIG. 10A.

While the distribution system of the present invention may be used to interconnect fiber optic cables in a single bay to remote equipment, it is equally useful in cross-connection applications where jumper fibers are conveyed between different bays, as illustrated in FIG. 7. Each of the jumper organizers 16 comprises a spool 102 for maintain a minimum bend radius of the jumper slack, and one or more retention fingers 104 for keeping the fibers within the organizer's vertical raceway. Provision of several spools in each bay, as well as upper and lower troughs, allows the jumper cables to be supported in such a manner than there are never more than two continuous bends of more than 90°, and these two bends are limited to about 180°. It is also easy to store excess jumper slack 106 from a cross-connection wherein both ends of the jumper terminate in the same cabinet or tray; such excess slack may be required to minimize modal noise. The present invention further provides minimal or no disturbance of other fibers when installing or rerouting jumpers, and a 1.5" (3.8 cm) minimum bend radius is maintained throughout the system.

The dimensions of the various components of distribution system 10 may vary widely depending upon the intended use but, as mentioned above, the system may advantageously be designed to fit in a standard equipment rack. These racks have a frame or bay approximately 7' high and 23" (58 cm) wide. The following approximate dimensions are based on the use of this rack. Cabinets 22 are 17"×12"×5.2", and the width of the vertical raceway for jumper organizers 16 is 6.5". Twelve cabinets of this size will fit vertically stacked in a single bay. Trays fitting inside such cabinets can accommodate 12 conventional ferrule connectors, with six such tray inside one cabinet, resulting in interconnection densities of up to 864 connectors per bay being achieved with the foregoing design.

Figure 9:
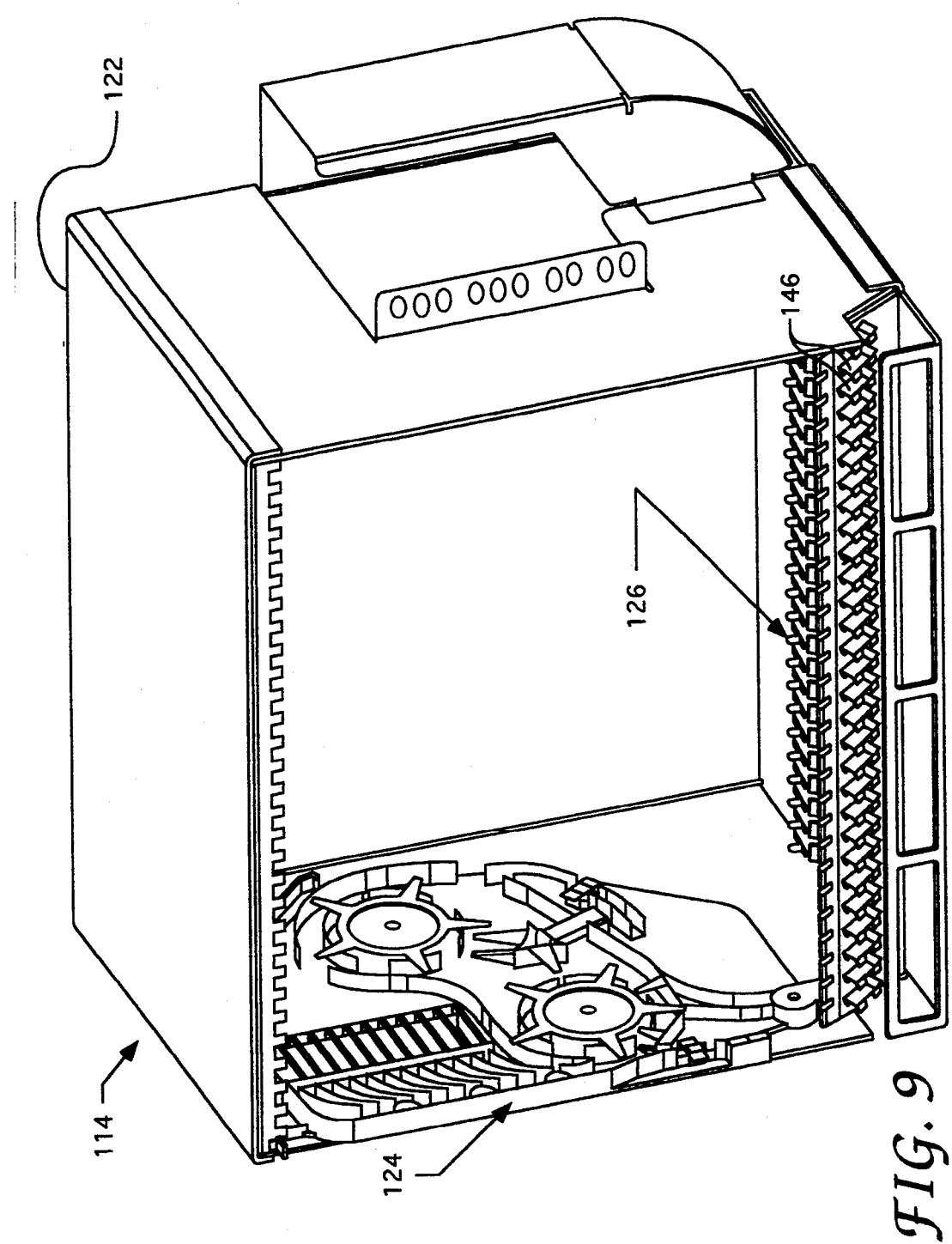
FIG. 9 is a perspective view of an alternative connector module and connector tray used with the embodiment of FIG. 8.

Another embodiment 110 of the fiber distribution system of the present invention is shown in FIGS. 8–13. Distribution system 110 has components similar to those of system 10, including a frame 112, a plurality of different connector modules 114, a plurality of jumper organizers 116, and upper and lower troughs 118 and 120. As seen in FIG. 9, connector module 114 has a cabinet 122 which is taller than cabinet 22, and retains connector trays 124 in a vertically stored position. A bracket 126 mounted inside cabinet 122 behind the connector trays secures the back plane spiral wrap tubing, and a plurality of ribs 127 limit the radius of the back plane fiber.

Figure 10B:
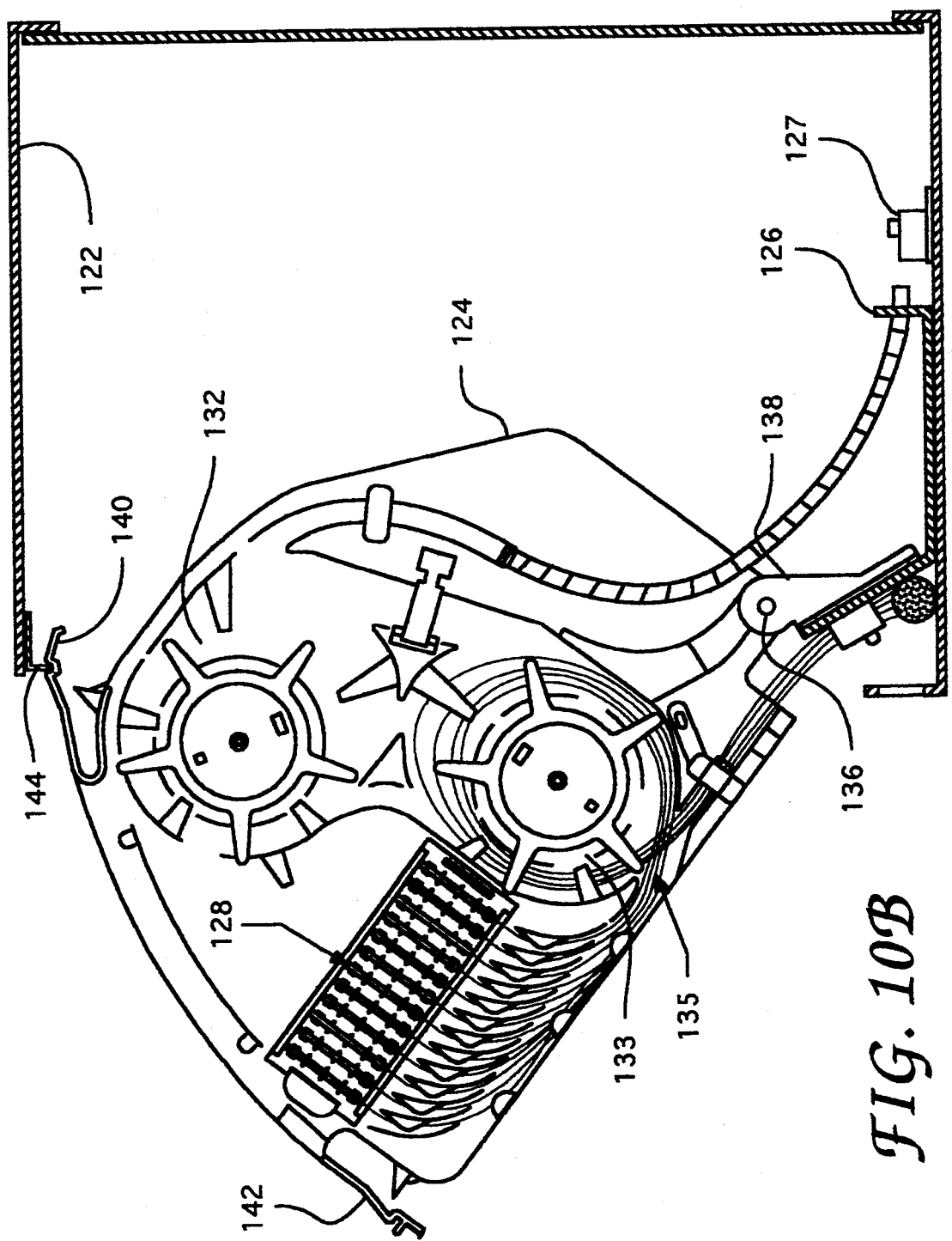
Figure 10C:
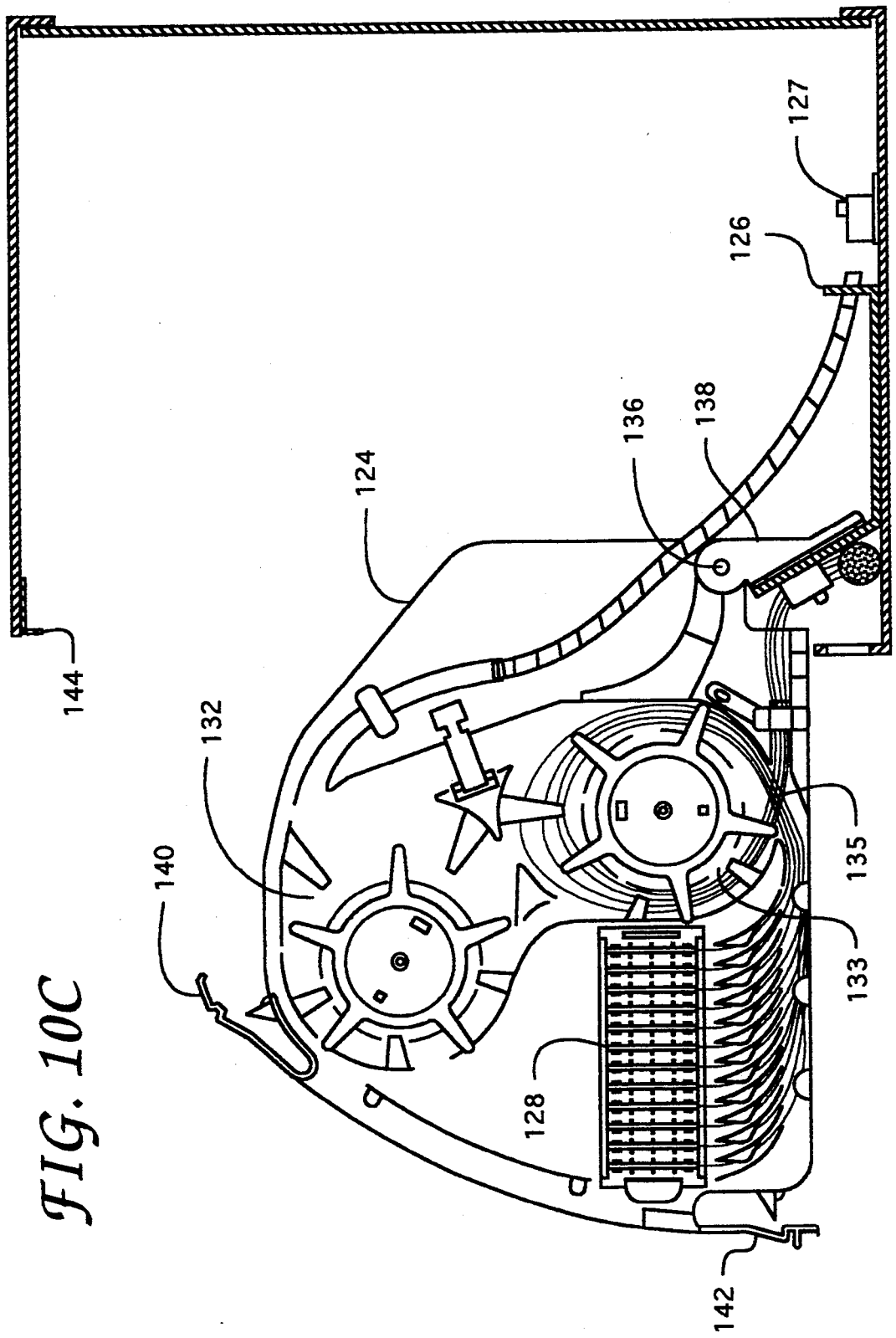
Figure 11:
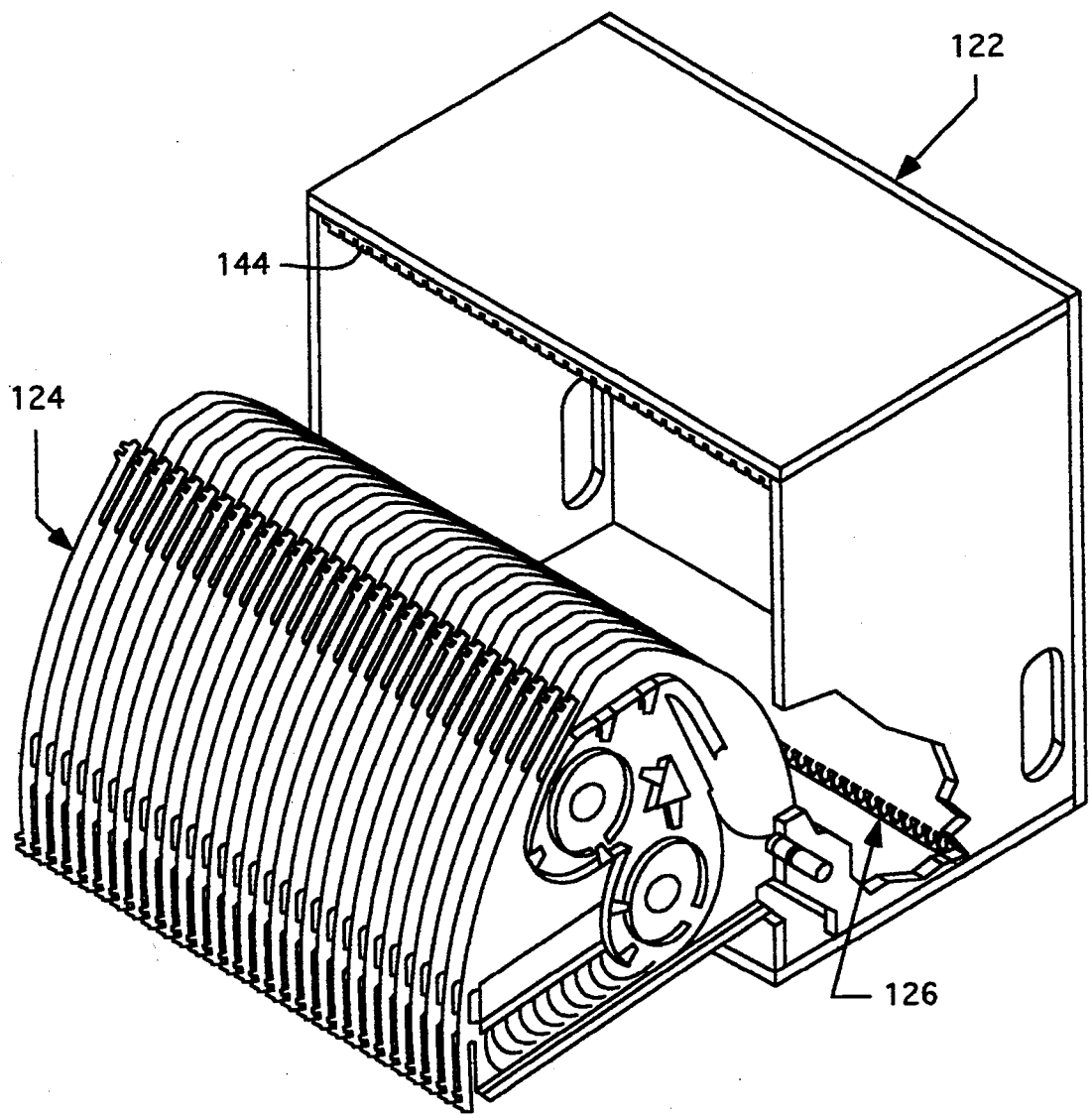
FIG. 11 is a perspective view similar to FIG. 9 but showing all of the connector trays in the back plane access position.

Connector tray 124 and its movement within cabinet 122 are illustrated in FIGS. 10A–10C. Connector tray 124 is also similar to tray 24, and has an interconnection area 128, a back plane slack storage area 132 for incoming fibers 134 and a front plane slack storage area 133 for jumper fibers 135. A common pivot pin 136 passes through swivel brackets 138 on each tray 124. Tray 124 has two latching clips 140 and 142 which engage a single clasp 144 at the front opening of cabinet 122; the trays can all be extended, as shown in FIG. 11, to provide access to the back plane fibers. Moreover, the front and back plane slack storage areas are placed near each other to allow rerouting and direct interconnection of the front and back plane fibers without disturbing interconnection area 128. By placing joining passages directly between the front and back plane fibers, distribution system 110 provides for custom circuit path arrangements, allowing field termination of in-line fiber devices, as well as fiber pass-through applications, in addition to the traditional cross-connect and interconnect functions.

Minimum radius of jumper fibers 135 is also maintained after exiting tray 124, and during movement thereof, by another plurality of walls or ribs 146 which capture and guide the fibers after they exit the trays via the jumper ports. Ribs 146 are formed along a plane which intersects the motion of jumper fibers 135 as tray 124 moves between the storage and tray access positions, thereby minimizing the bending radii of the jumpers at these positions. The use of ribs 146, along with front plane slack storage area 133, also isolates connection points from outside pulling forces applied to said jumper fiber. If the jumpers fibers are subjected to a pulling force in the direction of the large arrow in FIG. 12, most of the resulting tension will be dissipated by the coiling of the fiber in area 133, so that very little tension will actually be felt at interconnection area 28.

Figure 13:
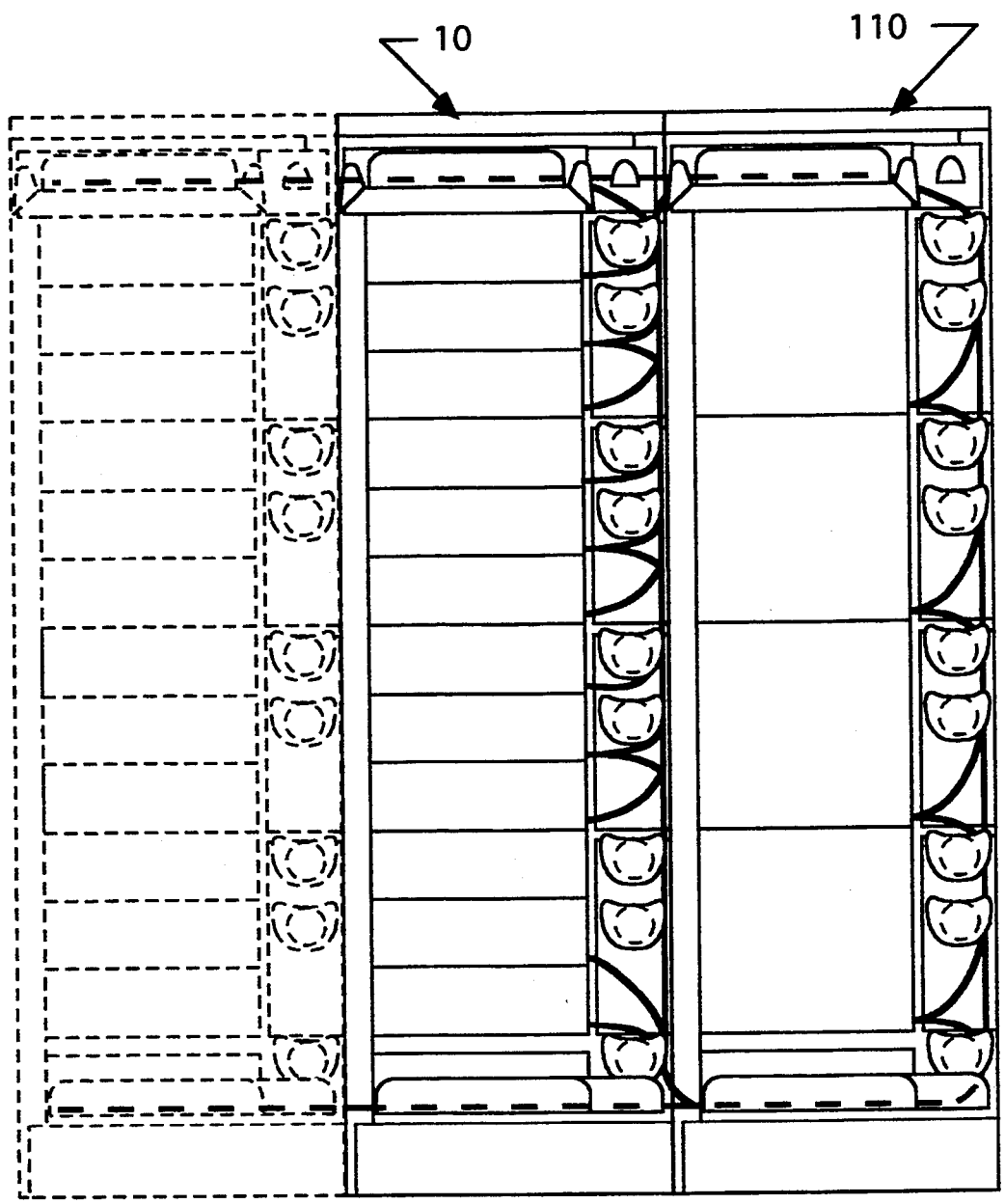
FIG. 13 is a front elevational view of a series of adjacent bays made in accordance with the present invention.

The dimensions of the various components of distribution system 110 also vary depending upon the intended use, but it is similarly designed to fit in a standard equipment rack. The following approximate dimensions are again based on the use of this rack. Cabinets 122 are 17"×12"×15.7", and the width of the vertical raceway for jumper organizers 116 is 5". Four cabinets of this size will fit vertically stacked in a single bay. As with system 10, system 110 can be used to make direct interconnections with remote equipment, or be used in multi-bay frames, as shown in FIG. 13.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

We claim:

1. A tray for supporting an interconnected pair of optical fibers terminated in respective optical fiber connectors, comprising:
   a base;
   a storage area on said base for receiving a slack portion of a first one of the fibers;
   means attached to said base at said storage area for maintaining the slack portion of the first fiber with a minimum bend radius;
   means for supporting the optical fiber connectors, said supporting means defining a forward area of said base for receiving a proximate portion of a second one of the optical fibers;
   a first arcuate wall attached to said base, in said forward portion thereof, for maintaining a minimum bend radius of the proximate portion of the second fiber; and
   a second arcuate wall attached to said base, in said forward portion thereof and proximate said first arcuate wall, for biasing the proximate portion of the second fiber toward said first arcuate wall.

2. The tray of claim 1 wherein said supporting means includes a coupling for interconnecting the optical fiber connectors, said coupling having an alignment axis, and further comprising means for releasably securing said coupling in a first position wherein said axis is generally parallel with said base, and in a second position wherein said axis is skewed with respect to said base.

3. A cabinet utilizing the tray of claim 1, and further comprising:
   a housing having an opening;
   means for retaining the tray in a first position wherein the tray is completely inside said housing, and in a second position wherein the tray extends substantially through said opening of said housing; and
   means attached to said housing for pivotally moving the tray between said first and second positions.

4. The tray of claim 2 further comprising means for resisting side pull at said coupling when said coupling is in said first position.

5. A distribution system utilizing the cabinet of claim 3, and further comprising:
   a frame defining a bay, the cabinet being attached to said frame and located in said bay; and
   means attached to said frame, outside of the cabinet, for organizing a jumper portion of the second fiber.

6. The distribution system of claim 5 wherein said frame has an upper end and a lower end, and further comprising:
   an upper trough attached to said upper end of said frame; and
   a lower trough attached to said lower end of said frame.

7. The distribution system of claim 5 wherein:
   a plurality of the cabinets are attached to said frame; and
   said organizing means includes a plurality of spools attached to said frame such that, when said frame is placed upright, said spools are arranged vertically.

8. The distribution system of claim 7 further comprising:
   another frame defining another bay having another plurality of cabinets and spools therein; and
   a plurality of jumper fibers supported by spools on both of said frames such that none of said jumper fibers undergoes more than two continuous bends of more than about 90°.

9. The distribution system of claim 7 wherein:

the second fiber has a distal portion which is terminated in the same cabinet receiving the proximate portion thereof;

the total length of the second fiber is about 2 meters or more; and the jumper portion of the second fiber is supported by one of said spools.

10. A distribution system for optical fiber interconnection, comprising:

first and second frames, defining first and second bays, respectively, each of said frames having an upper end and a lower end;

a first plurality of cabinets in said first bay and a second plurality of cabinets in said second bay;

a first plurality of connector trays in one of said first plurality of cabinets and a second plurality of connector trays in one of said second plurality of cabinets;

a first plurality of spools in said first bay, each adjacent one of said first plurality of cabinets and a second plurality of spools in said second bay, each adjacent one of said second plurality of cabinets;

an upper trough attached to said first frame, at said upper end thereof, for conveying a first set of jumper fibers from said first bay to said second bay; and a lower trough attached to said first frame, at said lower end thereof, for conveying a second set of jumper fibers from said first bay to said second bay.

11. The distribution system of claim 10 further comprising a plurality of jumper fibers supported by said first and second spools such that none of said jumper fibers undergoes more than two continuous bends of more than about 90°.

12. The distribution system of claim 10 further comprising an intracabinet jumper fiber wherein:

said jumper fiber has two terminal ends each terminated in the same cabinet;

the total length of said jumper fiber is about 2 meters or more; and an intermediate portion of said jumper fiber is supported by one of said spools.

13. A distribution system for optical fiber interconnection, comprising:

first and second frames, defining first and second bays;

a plurality of cabinets in each of said bays;

a plurality of connector trays in each of said cabinets;

a trough conveying a set of jumper fibers from cabinets in said first bay to cabinets in said second bay;

a plurality of spools attached to said first and second frames and arranged such that said jumper fibers, when supported by said spools, undergo no more than two continuous bends of more than about 90°.

14. The distribution system of claim 13 further comprising:

first and second upper troughs attached to said first and second frames, respectively, at upper ends thereof, for conveying a first set of jumper fibers from said first bay to said second bay; and first and second lower troughs attached to said first and second frames, respectively, at lower ends thereof, for conveying a second set of jumper fibers from said first bay to said second bay 15. The distribution system of claim 13 further comprising another jumper fiber, wherein:

said other jumper fiber has two terminal ends each terminated in the same cabinet;

the total length of said other jumper fiber is about 2 meters or more; and an intermediate portion of said other jumper fiber is supported by one of said spools.

16. A distribution system for optical fiber interconnection, comprising:

a frame defining a bay;

a plurality of cabinets in said bay;

a plurality of connector trays in each of said cabinets;

a plurality of spools attached to said frame and arranged such that, when said frame is placed upright, said spools are arranged vertically; and an intracabinet jumper fiber about 2 meters or more in length, having first and second ends both terminated in a common one of said cabinets, said jumper fiber having an intermediate portion supported by one of said spools.

17. The distribution system of claim 16 wherein said frame has an upper end and a lower end, and further comprising:

an upper trough attached to said upper end of said frame; and a lower trough attached to said lower end of said frame.

18. The distribution system of claim 16 further comprising:

another frame defining another bay having another plurality of cabinets and spools therein; and a plurality of jumper fibers supported by spools on both of said frames such that none of said jumper fibers undergoes more than two continuous bends of more than about 90°.

19. An article for supporting a fiber optic connector coupling, comprising:

a tray having a base;

an arm member formed on said base of said tray, extending generally parallel with said base and slightly raised from said base;

an elongated coupling adapter having first and second ends;

means, located at said first end of said adapter, for receiving the coupling;

means, located at said second end of said adapter and engaging said arm member, for pivoting attaching said second end of said adapter to said base of said tray.

20. The article of claim 19 wherein the coupling has an alignment axis, and further comprising means, located at said second end of said adapter, for biasing said adapter toward an operational position, wherein the coupling axis is generally parallel with said base, or a retracted position wherein the coupling axis is skewed with respect to said base.

21. The article of claim 19 further comprising means, located at said first end of said adapter, for resisting side-pulling forces at the coupling.

22. The article of claim 20 further comprising means, located at said first end of said adapter, for resisting side pulling forces at the coupling.

23. The article of claim 21 wherein said side-pulling resisting means includes:

latch members attached to said first end of said adapter; and means, formed on said base of said tray, for releasably engaging said latch members.

24. A cabinet for an optical fiber distribution system, comprising:

a housing having a front opening and a side port;

a plurality of connector trays in said housing, each connector tray having a swivel bracket, a gap along an edge of said tray proximate said swivel bracket, and a jumper port proximate said swivel bracket;

means for attaching each said swivel bracket to said housing such that each said connector tray may be pivoted between a storage position wherein said tray is completely inside said housing, and a tray access position wherein said tray extends substantially through said opening of said housing;

at least one incoming fiber entering said housing through said side port, said incoming fiber further entering one of said connector trays at said gap, proximate said swivel;

at least one jumper fiber interconnected to said incoming fiber on said connector tray, said jumper fiber exiting said tray through said jumper port; and means attached to said housing for capturing said jumper fiber as it exits said tray through said jumper port, and for maintaining a minimum bend radius of said jumper fiber as said tray is moved from said storage position to said tray access position.

25. The optical fiber distribution cabinet of claim 24 wherein at least one of said connector trays has a front plane storage area for receiving excess slack from said jumper fiber, and a back plane storage area for receiving excess slack from said incoming fiber, there further being a passageway on said tray joining said front and back plane storage areas.

26. The optical fiber distribution cabinet of claim 24 further comprising:

connector means attached to a terminal end of said jumper fiber, in said tray; and means, located in said tray, for isolating said connector means from outside pulling forces applied to said jumper fiber.

27. The optical fiber distribution cabinet of claim 24 wherein each of said connector trays are further movable to a back plane access position such that, when all of said connector trays are in said back plane access position, access is provided to an interior space of said cabinet.

28. The optical fiber distribution cabinet of claim 24 wherein said capturing means comprises a plurality of ribs attached to said housing proximate respective swivel brackets of said connector trays, said ribs being formed along a plane which intersects the motion of said jumper fiber as said tray moves between said storage and tray access positions.

* * * * *